(12) United States Patent
Reinhardt et al.

(10) Patent No.: US 12,180,074 B2
(45) Date of Patent: Dec. 31, 2024

(54) SYSTEMS AND METHODS FOR PRODUCING SYNGAS FROM BIO-OIL

(71) Applicant: Charm Industrial, Inc., San Francisco, CA (US)

(72) Inventors: Peter Reinhardt, San Francisco, CA (US); Shaun Kinetic, San Francisco, CA (US); Kelly Kinetic, San Francisco, CA (US); Jacob Wilkins, San Francisco, CA (US); Brian Jamieson, Brighton, CO (US)

(73) Assignee: Charm Industrial, Inc., San Francisco, CA (US)

( * ) Notice: Subject to any disclaimer, the term of this patent is extended or adjusted under 35 U.S.C. 154(b) by 0 days.

(21) Appl. No.: 18/503,036

(22) Filed: Nov. 6, 2023

(65) Prior Publication Data
US 2024/0150170 A1 May 9, 2024

Related U.S. Application Data

(60) Provisional application No. 63/423,476, filed on Nov. 7, 2022.

(51) Int. Cl.
*C01B 3/38* (2006.01)
*B01J 4/00* (2006.01)
(Continued)

(52) U.S. Cl.
CPC .............. *C01B 3/382* (2013.01); *B01J 4/002* (2013.01); *C01B 3/50* (2013.01); *C21B 13/0073* (2013.01);
(Continued)

(58) Field of Classification Search
None
See application file for complete search history.

(56) References Cited

U.S. PATENT DOCUMENTS 3,019,100 A * 1/1962 Robson ............... C21B 13/0033
423/652
5,078,788 A 1/1992 Bueno C. et al.
(Continued)

FOREIGN PATENT DOCUMENTS

AU 2012324965 B2 * 6/2015 ............... C10J 3/50
CN 101538627 A 9/2009
(Continued)

OTHER PUBLICATIONS

Venderbosch R H, NL 1022114, English Translation from FIT (Year: 2004).*
(Continued)

*Primary Examiner* — Colin W. Slifka
(74) *Attorney, Agent, or Firm* — Goodwin Procter LLP

(57) ABSTRACT

Disclosed herein are systems and methods for producing synthesis gas (syngas) using bio-oil. In some embodiments, syngas is produced by steam reforming bio-oil. In some embodiments, the bio-oil is provided in liquid form. In some embodiments at least some of the liquid bio-oil is transitioned into droplet form when entering a reformer for steam-reforming. In some embodiments, the reformer produces a gas stream comprising syngas, which may be fed to a furnace (e.g., direct reducing furnace, shaft furnace) for reducing iron ore to iron. In some embodiments, the amount of oxygen provided to the reformer is regulated based on an equivalence ratio (ER) corresponding to moles of oxygen fed to the reformer divided by moles of oxygen necessary to achieve stoichiometric combustion of the bio-oil, wherein an exemplary ER value is from about 0.1 to about 0.6.

29 Claims, 17 Drawing Sheets

(51) Int. Cl.
*C01B 3/50* (2006.01)
*C21B 13/00* (2006.01)

(52) U.S. Cl.
CPC .......... *C01B 2203/0233* (2013.01); *C01B 2203/0244* (2013.01); *C01B 2203/04* (2013.01); *C01B 2203/1235* (2013.01); *C01B 2203/147* (2013.01); *C01B 2203/1628* (2013.01); *C01B 2203/169* (2013.01)

(56) References Cited

U.S. PATENT DOCUMENTS

| | | |
|---|---|---|
| 7,198,658 B2 | 4/2007 | Sugitatsu et al. |
| 7,931,731 B2 | 4/2011 | Van Heeringen et al. |
| 8,753,422 B2 | 6/2014 | Gharda |
| 8,764,875 B2 | 7/2014 | Huang et al. |
| 8,906,131 B2 | 12/2014 | Simmons |
| 9,238,598 B2 | 1/2016 | Hammad et al. |
| 9,840,445 B2 | 12/2017 | Winter et al. |
| 10,093,996 B2 | 10/2018 | Winter et al. |
| 11,591,662 B2 | 2/2023 | Castagnola et al. |
| 2008/0311010 A1 | 12/2008 | Boe |
| 2020/0191481 A1 | 6/2020 | Cox et al. |
| 2021/0261877 A1 | 8/2021 | Despen et al. |
| 2021/0348076 A1 | 11/2021 | Despen et al. |
| 2021/0355398 A1 | 11/2021 | Despen et al. |
| 2021/0380406 A1 | 12/2021 | Zhou et al. |
| 2022/0098700 A1 | 3/2022 | Mennell et al. |
| 2022/0162077 A1 | 5/2022 | Mennell et al. |
| 2022/0162725 A1 | 5/2022 | Mennell et al. |
| 2022/0162726 A1 | 5/2022 | Mennell et al. |
| 2023/0160028 A1 | 5/2023 | Hyllander et al. |

FOREIGN PATENT DOCUMENTS

| | | | | |
|---|---|---|---|---|
| CN | 112892413 A | * | 6/2021 | ............ B01F 3/08 |
| GB | 2014604 A | | 8/1979 | |
| JP | 7128892 B2 | | 8/2022 | |
| NL | 1022114 C2 | * | 6/2004 | ............ C01B 3/24 |
| WO | WO-2009007007 A1 | | 1/2009 | |
| WO | WO-2014040989 A2 | | 3/2014 | |
| WO | WO-2015035969 A2 | | 3/2015 | |
| WO | WO-2019093949 A1 | * | 5/2019 | ............ C10G 2/32 |
| WO | WO-2021037700 A1 | | 3/2021 | |
| WO | WO-2021214167 A1 | | 10/2021 | |
| WO | WO-2022023187 A1 | | 2/2022 | |
| WO | WO-2022061398 A1 | | 3/2022 | |
| WO | WO-2022104443 A1 | | 5/2022 | |
| WO | WO-2022109663 A1 | | 6/2022 | |
| WO | WO-2022159022 A1 | | 7/2022 | |
| WO | WO-2022233769 A1 | | 11/2022 | |
| WO | WO-2022264904 A1 | | 12/2022 | |
| WO | WO-2023043358 A1 | | 3/2023 | |
| WO | WO-2023052308 A1 | | 4/2023 | |
| WO | WO-2023066794 A1 | | 4/2023 | |

OTHER PUBLICATIONS

Yuan et al, CN 112892413, English Translation from FIT (Year: 2021).*
Vagia et al, "Thermodynamic analysis of hydrogen production via autothermal steam reforming of selected components of aqueous bio-oil fraction," International Journal of Hydrogen Energy 33, 2008, pp. 2,489-2,500 (Year: 2008).*
U.S. Appl. No. 18/409,428, filed Jan. 10, 2024, Systems and Methods for Self-Reduction of Iron Ore (CHN-004US), Reinhardt.
Rierson, D. and Albert, A., "Development of the ACCAR Process at Allis-Chalmers," Ironmaking Proceedings, 1977:455-467.
Lepinski, James, "The ACCAR system and its application to direct reduction of iron ores," Iron and Steel Engineer, Dec. 1980, 57(12) (9 pages).
Hwang, Jae Gyu, et al., "Quality improvement and tar reduction of syngas produced by bio-oil gasification," Energy, vol. 236, Jul. 13, 2021, 10 pages.
International Search Report and Written Opinion for International Patent Application No. PCT/US2023/036887, dated Mar. 1, 2024, 14 pages.
International Search Report and Written Opinion for International Patent Application No. PCT/US2024/011091, dated Mar. 27, 2024, 15 pages.
Zheng, Ji-Lu, et al., "Bio-oil gasification using air—Steam as gasifying agents in an entrained flow gasifier," Energy, vol. 142, Oct. 9, 2017 (Oct. 9, 2017), pp. 426-435.
Vagia, E. C., et al., "Thermodynamic Analysis of Hydrogen Production via Autothermal Steam Reforming of Selected Components of Aqueous Bio-Oil Fraction," Int'l Journal of Hydrogen Energy, 33 (2008), pp. 2489-2500.

* cited by examiner

Bio-Oil (Stream 001)

| | Heavy Ends | | | Light Ends | | | Medium FPBO | |
|---|---|---|---|---|---|---|---|---|
| wt% | Minimum | Maximum | wt% | Minimum | Maximum | wt% | Minimum | Maximum |
| C | 60 | 68 | C | 20 | 50 | C | 50 | 60 |
| H | 6 | 10 | H | 6 | 10 | H | 8 | 12 |
| O | 34 | 19.9 | O | 74 | 37.9 | O | 42 | 25.9 |
| N | 0 | 2 | N | 0 | 2 | N | 0 | 2 |
| S | 0 | 0.1 | S | 0 | 0.1 | S | 0 | 0.1 |

Syngas Composition (found in Stream 101)

| | Heavy Ends | | | Light Ends | |
|---|---|---|---|---|---|
| mol% | Minimum | Maximum | mol% | Minimum | Maximum |
| Particulate | 0 | 4.8 | Particulate | 0 | 4 |
| Tars | 0 | 1 | Tars | 0 | 1 |
| H2O | 0.5 | 25 | H2O | 10 | 40 |
| CO | 40 | 60 | CO | 20 | 45 |
| CO2 | 5 | 15 | CO2 | 10 | 30 |
| CH4 | 0.5 | 5 | CH4 | 0.5 | 15 |
| H2 | 22 | 35 | H2 | 10 | 20 |
| O2 | 0 | 3 | O2 | 0 | 3 |
| N2 | 0 | 5 | N2 | 0 | 5 |

FIG. 2

| | 001 | 002 | 101 | 201 | 202 | 301 | 401 | 402 |
|---|---|---|---|---|---|---|---|---|
| H2 (% vol) | | | 10%-25% | 10%-25% | | 10%-25% | 20%-40% | |
| CO (% vol) | | | 15%-30% | 15%-30% | | 15%-30% | 25%-45% | |
| CO2 (% vol) | | | 15%-35% | 15%-30% | | 15%-30% | 30%-50% | |
| CH4 (% vol) | | | 0.5%-2% | 0.5%-2% | | 0.5%-2% | 0.5%-2.5% | |
| C2Hn (% vol) | | | 0.1%-0.3% | 0.1%-0.3% | | 0.1%-0.3% | 0.2%-0.5% | |
| H2O (% vol) | | | 25%-60% | 25%-60% | Varies | 25%-60% | 0%-5% | |
| other | | | Varies | 0 | | | | |
| Temp (C) | 35-150 | 15-60 | 500-2000 | 250-750 | amb | 150-550 | 15-40 | amb |
| Pressure (MPa) | 3450-14000 | 100-300 | 7-15 | 1-5 | 7-15 | 1-5 | 0.5-2 | amb |

| Analyte | Result | Method | Collected | Analyzed |
|---|---|---|---|---|
| ID 202208094.2 | | | 07/09/22 13:45 | |
| Determination of Conventional Chemistry Parameters | | | | |
| Viscosity @40 C | 357.8 cSt | ASTM D445 | | 07/29/22 |
| Determinations of Total Metals | | | | |
| Arsenic, total | <10.0 mg/kg | EPA 6010B | | 08/04/22 |
| Barium, total | 4.42 mg/kg | EPA 6010B | | 08/04/22 |
| Cadmium, total | <2.0 mg/kg | EPA 6010B | | 08/04/22 |
| Calcium, total | 465 mg/kg | EPA 6010B | | 08/04/22 |
| Chromium, total | <6.0 mg/kg | EPA 6010B | | 08/04/22 |
| Copper, total | <6.0 mg/kg | EPA 6010B | | 08/04/22 |
| Iron, total | 83.5 mg/kg | EPA 6010B | | 08/04/22 |
| Lead, total | <10.0 mg/kg | EPA 6010B | | 08/04/22 |
| Magnesium, total | 111 mg/kg | EPA 6010B | | 08/04/22 |
| Manganese, total | 8.9 mg/kg | EPA 6010B | | 08/04/22 |
| Phosphorus, total | <300 mg/kg | EPA 6010B | | 08/04/22 |
| Potassium, total | 300 mg/kg | EPA 6010B | | 08/04/22 |
| Sodium, total | <300 mg/kg | EPA 6010B | | 08/04/22 |
| Zinc, total | <6.0 mg/kg | EPA 6010B | | 08/04/22 |
| Results as Received | | | | |
| Sulfur | 0.0138 % wt | ASTM D7039 | | 08/01/22 |
| Ash, Total | 0.637 % | ASTM D482 | | 07/28/22 |
| Carbon | 34.5 % | ASTM D5291 | | 07/27/22 |
| Hydrogen | 7.88 % | ASTM D5291 | | 07/27/22 |
| Nitrogen | 0.338 % | ASTM D5291 | | 07/27/22 |
| Oxygen by Difference | 56.6 % | | | 07/27/22 |
| Low Heat Value | 4848 BTU/lb | ASTM D240 | | 07/27/22 |
| High Heat Value | 5678 BTU/lb | ASTM D240 | | 07/27/22 |
| Water by Coulometric Karl Fischer | | | | |
| Water | 21.2 % | ASTM D6304 | | 07/28/22 |

FIG. 4B

| Analyte | Result | Method | Analyzed |
|---|---|---|---|
| ID:32206293 | Matrix: Oil | | Collected: 06/29/22 12:00 |
| Results as Received | | | |
| Sulfur | 0.0068 % wt | ASTM D7039 | 08/01/22 |
| Ash, Total | 4.72 % | ASTM D482 | 07/28/22 |
| Carbon | 47.7 % | ASTM D5291 | 07/27/22 |
| Hydrogen | 6.84 % | ASTM D5291 | 07/27/22 |
| Nitrogen | 0.330 % | ASTM D5291 | 07/27/22 |
| Oxygen by Difference | 40.4 % | ASTM D5291 | 07/27/22 |
| Low Heat Value | 7610 BTU/lb | ASTM D240 | 07/27/22 |
| High Heat Value | 8247 BTU/lb | ASTM D240 | 07/27/22 |
| Water by Coulometric Karl Fischer | | | |
| Water | 18.3 % | ASTM D6304 | 07/28/22 |

FIG. 4C

| Analyte | Result | Method | Analyzed |
|---|---|---|---|
| ID:202226303.4 | Matrix:Oil | | Collected: 06/30/22 12:00 |
| Results as Received | | | |
| Ash, Total | 0.147 % | ASTM D482 | 07/28/22 |
| Sulfur | 0.03 %wt | ASTM D4239 | 08/03/22 |
| Carbon | 55.0 % | ASTM D5291 | 07/27/22 |
| Hydrogen | 6.33 % | ASTM D5291 | 07/27/22 |
| Nitrogen | 0.360 % | ASTM D5291 | 07/27/22 |
| Oxygen by Difference | 38.2 % | ASTM D5291 | 07/27/22 |
| Low Heat Value | 8992 BTU/lb | ASTM D240 | 07/27/22 |
| High Heat Value | 9580 BTU/lb | ASTM D240 | 07/27/22 |
| Water by Coulometric Karl Fischer | | | |
| Water | 9.88 % | ASTM D6304 | 07/28/22 |

FIG. 4D

| Analyte | Result | | Method | Analyzed |
|---|---|---|---|---|
| ID:2022/0/11L5 | Matrix:Oil | | | Collected: 07/11/22 12:00 |
| Results as Received | | | | |
| Sulfur | 0.0139 | % wt | ASTM D7039 | 08/01/22 |
| Ash, Total | 5.26 | % | ASTM D482 | 07/28/22 |
| Carbon | 48.3 | % | ASTM D5291 | 07/27/22 |
| Hydrogen | 6.88 | % | ASTM D5291 | 07/27/22 |
| Nitrogen | 0.310 | % | ASTM D5291 | 07/27/22 |
| Oxygen by Difference | 39.2 | % | ASTM D5291 | 07/27/22 |
| Low Heat Value | 7711 | BTU/lb | ASTM D240 | 07/27/22 |
| High Heat Value | 8349 | BTU/lb | ASTM D240 | 07/27/22 |
| Water by Coulometric Karl Fischer | | | | |
| Water | 18.0 | % | ASTM D6304 | 07/28/22 |

FIG. 4E

| Analyte | Result | Method | Analyzed |
|---|---|---|---|
| ID2022071216 | | Matrix:Oil | Collected: 07/12/22 12:00 |
| Results as Received | | | |
| Sulfur | 0.0089 % wt | ASTM D7039 | 08/03/22 |
| Ash, Total | 1.30 % | ASTM D482 | 07/28/22 |
| Carbon | 46.6 % | ASTM D5291 | 07/27/22 |
| Hydrogen | 7.04 % | ASTM D5291 | 07/27/22 |
| Nitrogen | 0.340 % | ASTM D5291 | 07/27/22 |
| Oxygen by Difference | 44.5 % | ASTM D5291 | 07/27/22 |
| Low Heat Value | 7344 BTU/lb | ASTM D240 | 07/27/22 |
| High Heat Value | 7996 BTU/lb | ASTM D240 | 07/27/22 |
| Water by Coulometric Karl Fischer | | | |
| Water | 20.8 % | ASTM D6304 | 07/28/22 |

| Analyte | Result | Method | Analyzed |
|---|---|---|---|
| IL202206246-3 | | | Collected: 06/24/22 12:30 |
| Determination of Total Metals | | | |
| Phosphorus, total | 460 mg/kg | EPA 6010B | 08/05/22 |
| Potassium, total | 9460 mg/kg | EPA 6010B | 08/05/22 |
| Results as Received | | | |
| Moisture | 7.04 % wt | ASTM D7582 | 07/29/22 |
| Ash | 11.64 % wt | ASTM D7582 | 07/29/22 |
| Volatile Matter | 27.79 % wt | ASTM D7582 | 07/29/22 |
| Fixed Carbon | 53.53 % wt | ASTM D7582 | 07/29/22 |
| Sulfur | 0.02 % wt | ASTM D4239 | 07/29/22 |
| Carbon | 66.78 % wt | ASTM D5291 | 07/27/22 |
| Hydrogen | 3.55 % wt | ASTM D5291 | 07/27/22 |
| Nitrogen | 0.40 % wt | ASTM D5291 | 07/27/22 |
| Oxygen by Difference | 17.81 % wt | ASTM E711 | 07/27/22 |
| Low Heat Value | 9815 BTU/lb | ASTM E711 | 07/27/22 |
| High Heat Value | 10130 BTU/lb | ASTM E711 | 07/27/22 |
| Results Dry Weight Corrected | | | |
| Ash | 12.52 % wt | ASTM D7582 | 07/29/22 |
| Volatile Matter | 29.89 % wt | ASTM D7582 | 07/29/22 |
| Fixed Carbon | 57.58 % wt | ASTM D7582 | 07/29/22 |
| Sulfur | 0.02 % wt | ASTM D4239 | 07/29/22 |
| Carbon | 71.84 % wt | ASTM D5291 | 07/27/22 |
| Hydrogen | 2.26 % wt | ASTM D5291 | 07/27/22 |
| Nitrogen | 0.43 % wt | ASTM D5291 | 07/27/22 |
| Oxygen by Difference | 12.43 % wt | ASTM E711 | 07/27/22 |
| Low Heat Value | 10560 BTU/lb | ASTM E711 | 07/27/22 |
| High Heat Value | 10890 BTU/lb | ASTM E711 | 07/27/22 |

FIG. 41

| Analyte | Result | Method | Analyzed |
|---|---|---|---|
| ID ZC2206.24-24 | Matrix: Biofuels | Collected: 06/14/22 12:00 | |
| Determination of Total Metals | | | |
| Phosphorus, total | 2680 mg/kg | EPA 6010B | 08/03/22 |
| Potassium, total | 41980 mg/kg | EPA 6010B | 08/03/22 |
| Results as Received | | | |
| Moisture | 0.78 % wt | ASTM D7582 | 07/29/22 |
| Ash | 75.25 % wt | ASTM D7582 | 07/29/22 |
| Volatile Matter | 23.93 % wt | ASTM D7582 | 07/29/22 |
| Fixed Carbon | 0.05 % wt | ASTM D7582 | 07/29/22 |
| Sulfur | <0.01 % wt | ASTM D4239 | 07/27/22 |
| Carbon | 9.03 % wt | ASTM D5291 | 07/27/22 |
| Hydrogen | <0.50 % wt | ASTM D5291 | 07/27/22 |
| Nitrogen | 0.23 % wt | ASTM D5291 | 07/27/22 |
| Oxygen by Difference | 14.67 % wt | ASTM D5291 | 07/27/22 |
| Low Heat Value | 79 BTU/lb | ASTM E711 | 07/27/22 |
| High Heat Value | 99 BTU/lb | ASTM E711 | 07/27/22 |
| Results Dry Weight Corrected | | | |
| Ash | 75.83 % wt | ASTM D7582 | 07/29/22 |
| Volatile Matter | 24.10 % wt | ASTM D7582 | 07/29/22 |
| Fixed Carbon | 0.06 % wt | ASTM D7582 | 07/29/22 |
| Sulfur | <0.01 % wt | ASTM D4239 | 07/27/22 |
| Carbon | 9.11 % wt | ASTM D5291 | 07/27/22 |
| Hydrogen | <0.50 % wt | ASTM D5291 | 07/27/22 |
| Nitrogen | 0.23 % wt | ASTM D5291 | 07/27/22 |
| Oxygen by Difference | 14.69 % wt | ASTM D5291 | 07/27/22 |
| Low Heat Value | 79 BTU/lb | ASTM E711 | 07/27/22 |
| High Heat Value | 99 BTU/lb | ASTM E711 | 07/27/22 |

| Analyte | Result | Method | Analyzed |
|---|---|---|---|
| H262/21708C4 | | Matrix: Biobass | Collected: 07/08/22 12:00 |
| Determination of Total Metals | | | |
| Phosphorus, total | 440 mg/kg | EPA 6010B | 08/05/22 |
| Potassium, total | 5310 mg/kg | EPA 6010B | 08/05/22 |
| Results as Received | | | |
| Moisture | 4.02 % wt | ASTM D7582 | 07/29/22 |
| Ash | 12.33 % wt | ASTM D7582 | 07/29/22 |
| Volatile Matter | 34.82 % wt | ASTM D7582 | 07/29/22 |
| Fixed Carbon | 48.83 % wt | ASTM D7582 | 07/29/22 |
| Sulfur | 0.03 % wt | ASTM D4239 | 07/27/22 |
| Carbon | 63.26 % wt | ASTM D5291 | 07/27/22 |
| Hydrogen | 3.46 % wt | ASTM D5291 | 07/27/22 |
| Nitrogen | 0.39 % wt | ASTM D5291 | 07/27/22 |
| Oxygen by Difference | 20.52 % wt | ASTM D5291 | 07/27/22 |
| Low Heat Value | 9570 BTU/lb | ASTM E711 | 07/27/22 |
| High Heat Value | 9880 BTU/lb | ASTM E711 | 07/27/22 |
| Results: Dry Weight Corrected | | | |
| Ash | 12.84 % wt | ASTM D7582 | 07/29/22 |
| Volatile Matter | 36.28 % wt | ASTM D7582 | 07/29/22 |
| Fixed Carbon | 50.87 % wt | ASTM D7582 | 07/29/22 |
| Sulfur | 0.03 % wt | ASTM D4239 | 07/27/22 |
| Carbon | 65.91 % wt | ASTM D5291 | 07/27/22 |
| Hydrogen | 3.14 % wt | ASTM D5291 | 07/27/22 |
| Nitrogen | 0.41 % wt | ASTM D5291 | 07/27/22 |
| Oxygen by Difference | 17.66 % wt | ASTM D5291 | 07/27/22 |
| Low Heat Value | 9970 BTU/lb | ASTM E711 | 07/27/22 |
| High Heat Value | 10380 BTU/lb | ASTM E711 | 07/27/22 |

FIG. 4L

| Analyte | Result | Method | Analyzed 07/18/22 17:30 |
|---|---|---|---|
| ID 202202881 | | Matrix: BioMass | Collected: 07/18/22 17:30 |
| Results as Received | | | |
| Moisture | 7.25 % wt | ASTM D7582 | 07/29/22 |
| Ash | 1.76 % wt | ASTM D7582 | 07/29/22 |
| Volatile Matter | 74.77 % wt | ASTM D7582 | 07/29/22 |
| Fixed Carbon | 16.23 % wt | ASTM D7582 | 07/29/22 |
| Sulfur | <0.01 % wt | ASTM D4239 | 07/27/22 |
| Carbon | 46.64 % wt | ASTM D5291 | 07/27/22 |
| Hydrogen | 6.10 % wt | ASTM D5291 | 07/27/22 |
| Nitrogen | 0.22 % wt | ASTM D5291 | 07/27/22 |
| Oxygen by Difference | 45.28 % wt | ASTM D5291 | 07/27/22 |
| Low Heat Value | 7169 BTU/lb | ASTM E711 | 07/27/22 |
| High Heat Value | 7753 BTU/lb | ASTM E711 | 07/27/22 |
| Results Dry Weight Corrected | | | |
| Ash | 1.89 % wt | ASTM D7582 | 07/29/22 |
| Volatile Matter | 80.61 % wt | ASTM D7582 | 07/29/22 |
| Fixed Carbon | 17.50 % wt | ASTM D7582 | 07/29/22 |
| Sulfur | <0.01 % wt | ASTM D4239 | 07/27/22 |
| Carbon | 50.28 % wt | ASTM D5291 | 07/27/22 |
| Hydrogen | 5.70 % wt | ASTM D5291 | 07/27/22 |
| Nitrogen | 0.23 % wt | ASTM D5291 | 07/27/22 |
| Oxygen by Difference | 41.89 % wt | ASTM D5291 | 07/27/22 |
| Low Heat Value | 7729 BTU/lb | ASTM E711 | 07/27/22 |
| High Heat Value | 8359 BTU/lb | ASTM E711 | 07/27/22 |

FIG. 4M

SYSTEMS AND METHODS FOR PRODUCING SYNGAS FROM BIO-OIL

CROSS-REFERENCE

This application claims the benefit of and priority to U.S. Patent Application No. 63/423,476, titled "System and Methods for Producing Iron Using Syngas from Bio-Oil," and filed Nov. 7, 2022, which is incorporated herein by reference in its entirety.

BACKGROUND

Synthesis gas (syngas) is used by a variety of industrial processes for the production of various materials, such as methanol production for plastics and fabrics, kerosene production for airplanes, iron ore reduction for, among others, steel production, and ammonia production for fertilizer. Typically, a fossil fuel feedstock like coal or natural gas is used to produce syngas, which comprises carbon monoxide (CO) and hydrogen ($H_2$). Such use of fossil fuels can significantly increase global carbon dioxide emissions. Accordingly, there is a need to produce syngas using alternative means having a reduced carbon footprint.

SUMMARY

Disclosed herein, in some aspects, is a process for producing syngas, comprising: providing bio-oil to a reformer, wherein the bio-oil is at least partially atomized when entering the reformer; and reforming the bio-oil within the reformer, thereby producing syngas.

Disclosed herein, in some aspects, is a system for producing syngas, comprising: a bio-oil source containing bio-oil; a reformer for reforming the bio-oil to produce the syngas; and a flow path fluidly coupling the bio-oil source to the reformer, such that the bio-oil is configured to flow from the bio-oil source to the reformer, wherein the flow path is configured to at least partially atomize the bio-oil.

Disclosed herein, in some aspects, is a system for producing syngas, comprising: a bio-oil source containing bio-oil; a reformer for reforming the bio-oil to produce the syngas; and a flow path fluidly coupling the bio-oil source to the reformer, such that the bio-oil is configured to flow from the bio-oil source to the reformer, wherein the flow path is configured to at least partially atomize the bio-oil.

BRIEF DESCRIPTION OF THE DRAWINGS

These and other features, aspects, and advantages of some embodiments will become better understood with regard to the following description and accompanying drawings.

FIG. 1A depicts an exemplary process wherein syngas produced by a reformer is fed directly to a furnace for producing a material comprising iron, whereas FIG. 1B depicts syngas produced by the reformer being processed for removal of certain components prior to being fed to the furnace for producing the material comprising iron.

FIG. 2 provides exemplary compositions of bio-oil and corresponding syngas produced from reforming the bio-oil, according to an embodiment herein.

FIG. 3 provides exemplary conditions and composition information relating to the streams depicted in FIG. 1A (stream 001, 002, 101) and FIG. 1B (all streams), according to an embodiment disclosed herein.

FIGS. 4A-4M provide exemplary compositions in the feed bio-oil for producing syngas, according to an embodiment described herein.

DETAILED DESCRIPTION

I. Definitions

Figure 1A:
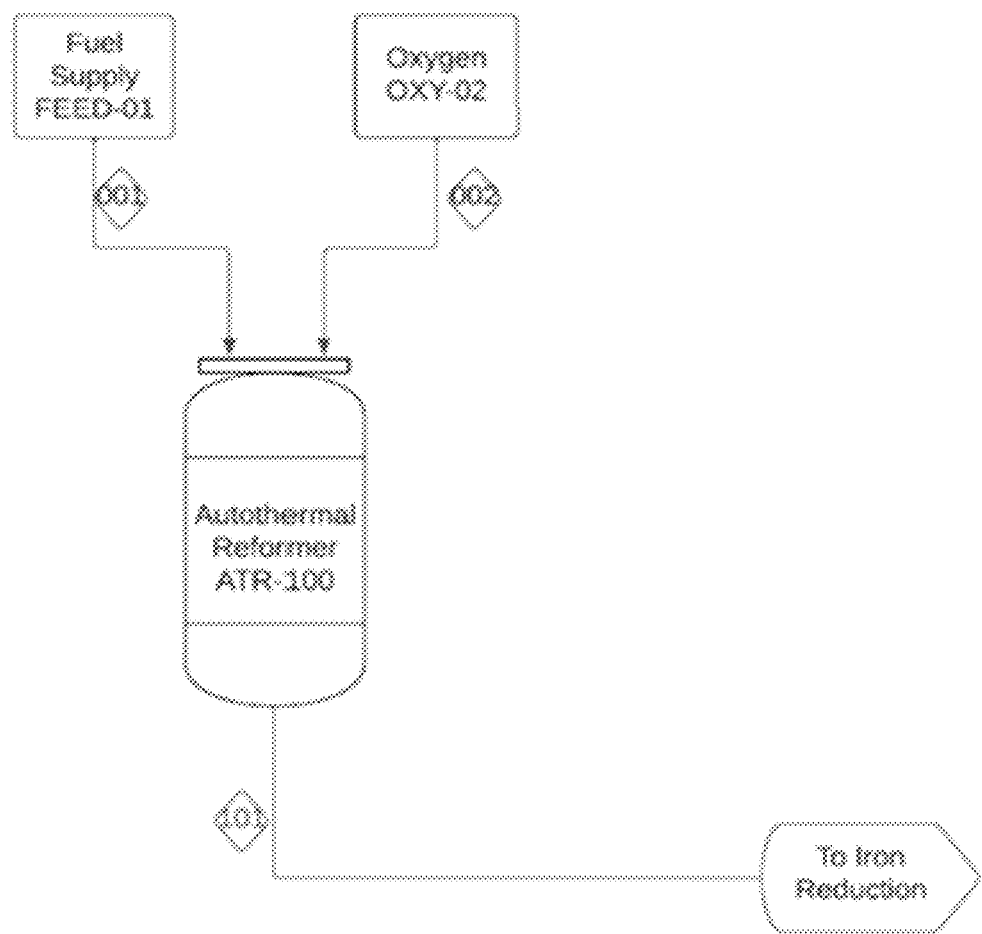
FIGS. 1A-1B depict flow diagrams for exemplary systems and processes for producing syngas from bio-oil, according to embodiments disclosed herein.

Terms used in the claims and specification are defined as set forth below unless otherwise specified.

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either," "one of," "only one of," or "exactly one of."

II. System Environment Overview

Described herein, in some embodiments, are systems and methods for producing synthesis gas (syngas) using bio-oil. Generally, syngas includes hydrogen ($H_2$) and carbon monoxide (CO), but can also include other components, such as carbon dioxide, methane, etc. In some embodiments, syngas is produced by steam reforming bio-oil. In some embodiments, the bio-oil is provided in liquid form. In some embodiments at least some of the liquid bio-oil is transitioned into droplet form when entering a reformer for steam-reforming. In some embodiments, the reformer produces a gas stream including condensable gases, non-condensable gases, particulate material, inorganic material, or any combination thereof. In some embodiments, the produced gas stream from the reformer, comprising syngas, is fed to a furnace (e.g., direct reducing furnace, shaft furnace) for reducing iron ore to iron (for example via a MIDREX® system). In some embodiments, the produced gas stream is fed directly to the furnace, or a system for reducing iron ore that may include pre-processing of the syngas prior to being fed to the furnace. In some embodiments, the gas stream produced from the reformer is further processed to remove one or more contaminants, particulate components, and/or condensable gases. In some embodiments, the gas stream produced is further processed so as to improve a quality of the syngas based on downstream processing requirements.

In some embodiments, syngas as produced via bio-oil corresponds to a reduction in global emissions as opposed to syngas produced via traditional methods (e.g., using natural gas). In some embodiments, such global emission reduction includes reduction in carbon dioxide ($CO_2$) emissions. In some embodiments, such reduction in carbon dioxide emissions is based on bio-oil being produced using biomass. In some embodiments, producing syngas using bio-oil, as described herein, can reduce global emissions (e.g., carbon dioxide emissions) by at least about 1%, 5%, 10%, 15%, 20%, 25%, 30%, 40%, or 50%.

Syngas may be used in various different downstream processes for producing one or more different products. For example, syngas may be used for iron making, which may include reduction of iron ore to iron (e.g., direct reduction iron, sponge iron), production of methanol, production of kerosene, and/or production of ammonia, among other processes. Accordingly, using syngas produced via bio-oil may result in a reduction of global emissions (e.g., carbon dioxide emissions) for steel making (which may include reduction of iron ore to iron), production of methanol, production of kerosene, and/or production of ammonia, among other processes.

Figure 1B:
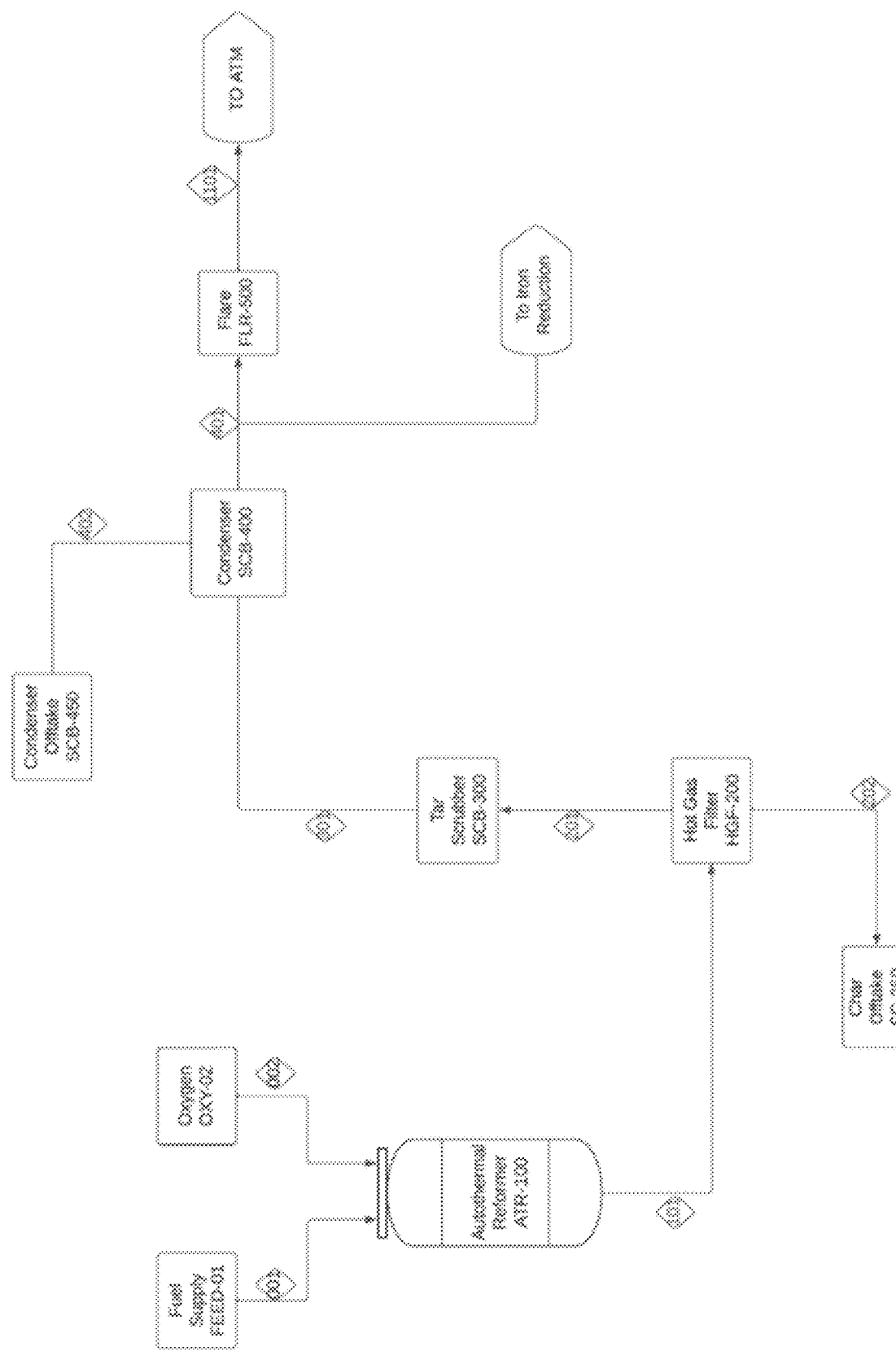
Figure 4A:
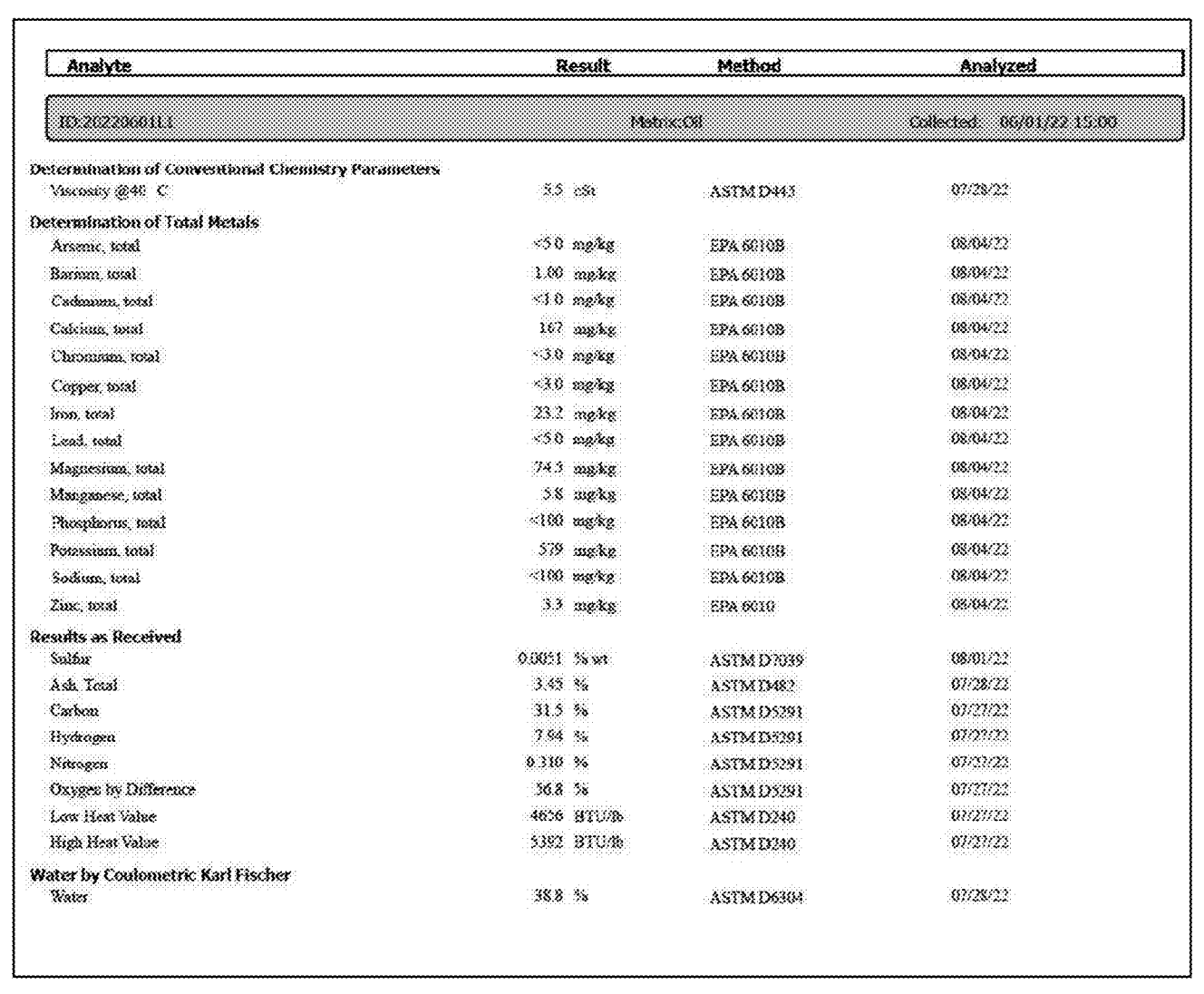
Figure 4G:
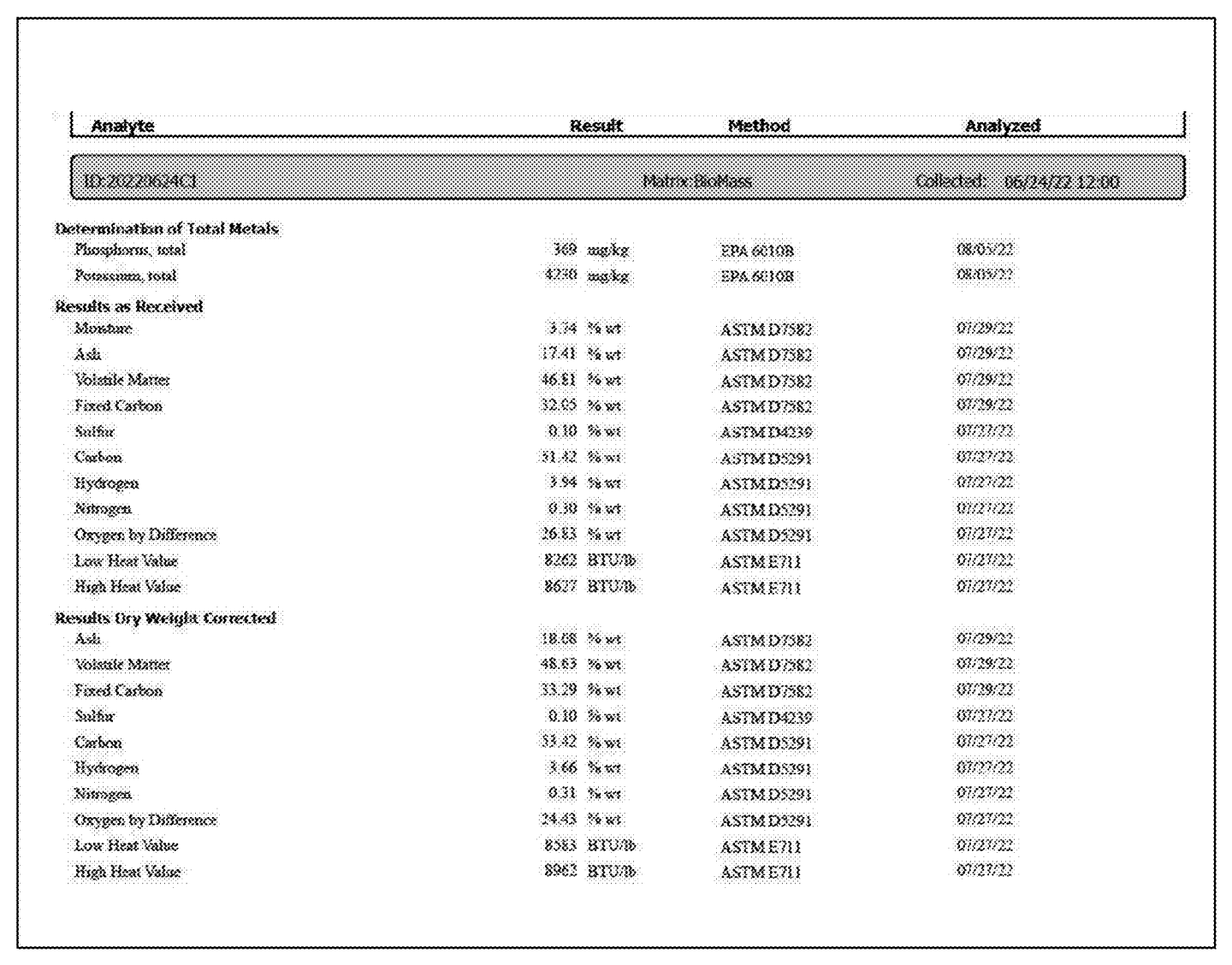
Figure 4H:
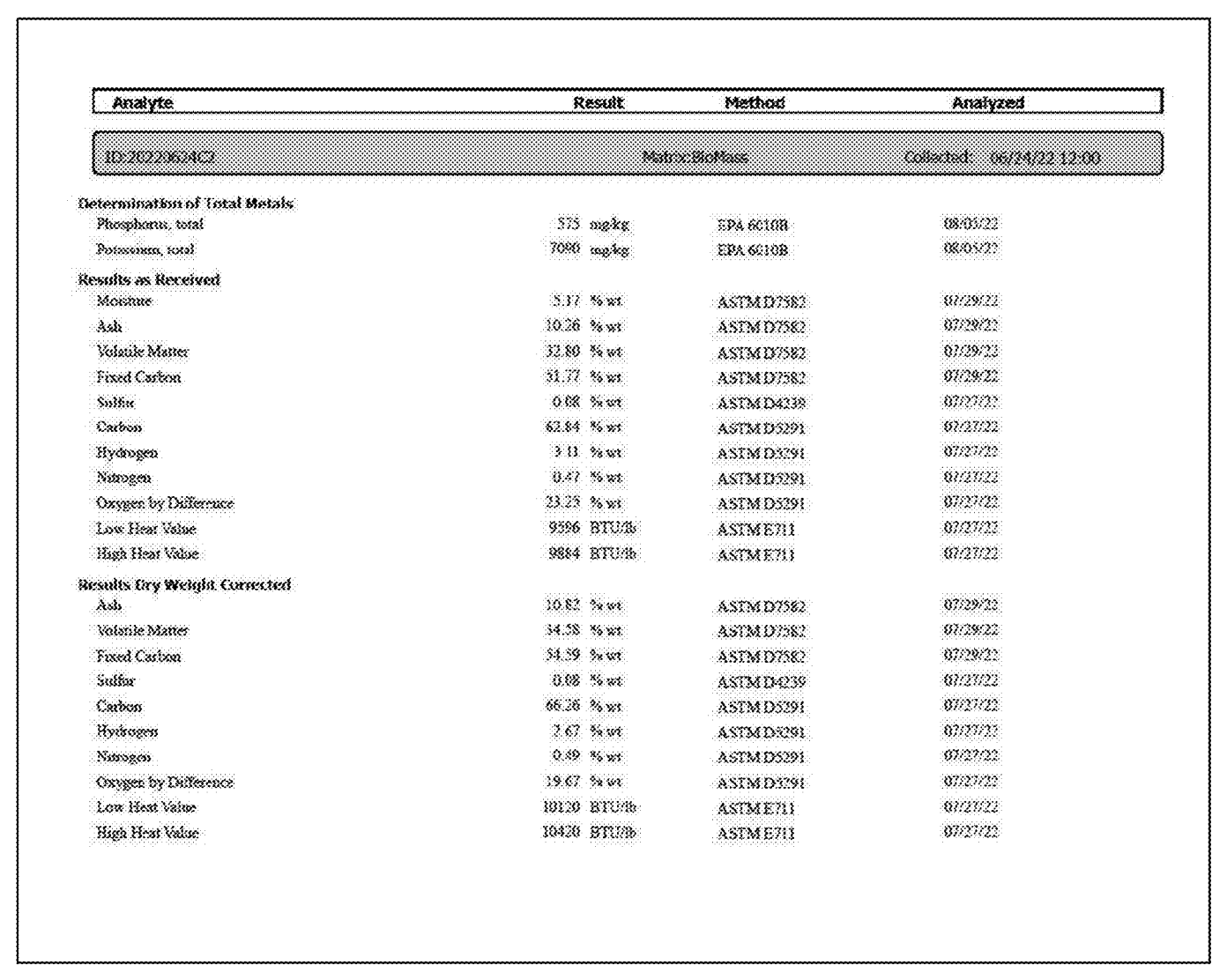
Figure 4K:
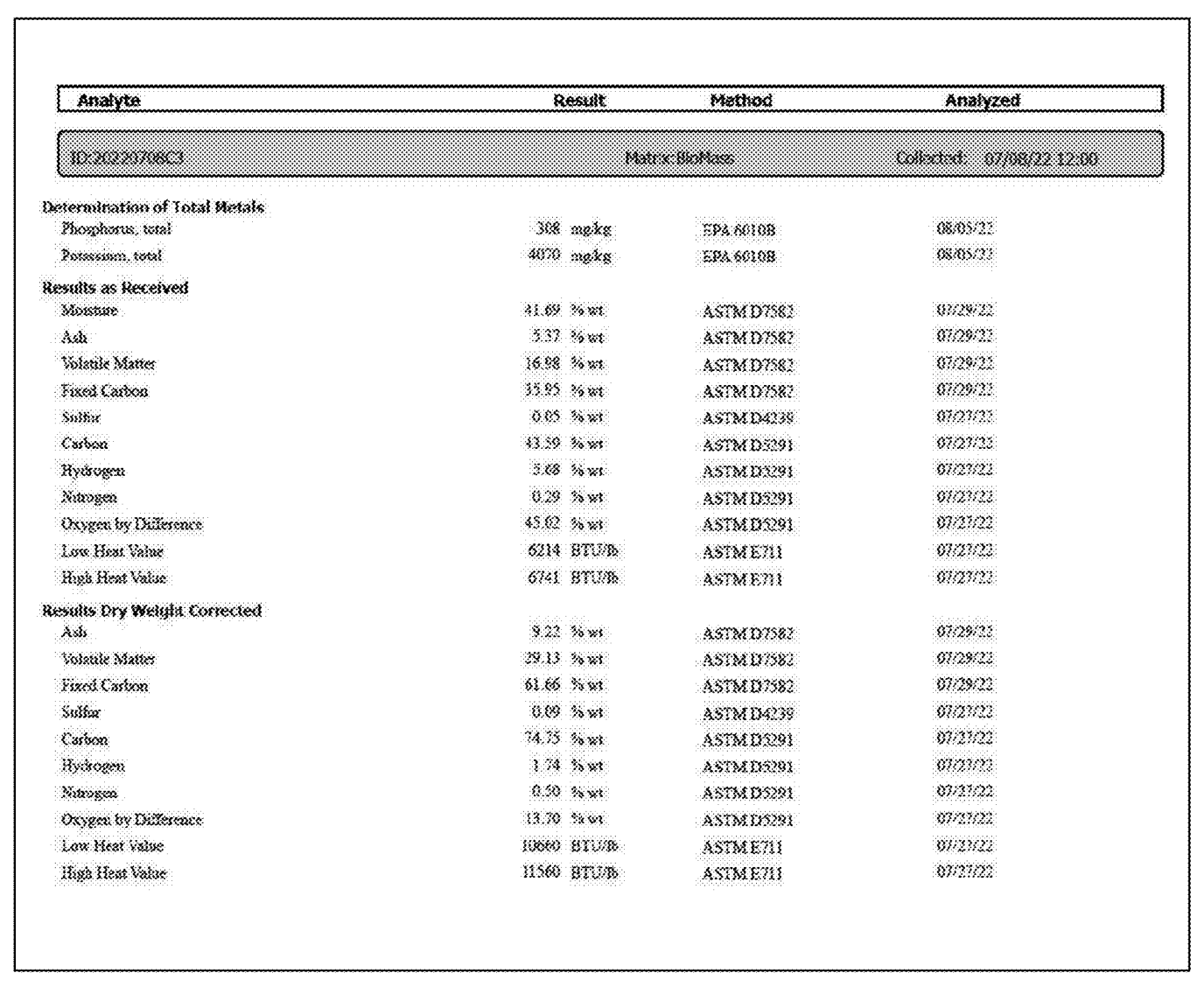

FIG. 1A depicts an exemplary flow diagram for a process of producing syngas from bio-oil, wherein the syngas (as part of the produced gas from the reformer ATR-100) is fed to a system (e.g., including a furnace) for reducing iron (e.g., from iron ore). The system may include one or more components for processing the syngas prior to feeding the furnace for reducing iron, or the syngas may be fed directly to the furnace. FIG. 1B depicts another exemplary flow diagram for a process of producing syngas from bio-oil, wherein the produced gas from the reformer is further processed to remove one or more contaminants, one or more particulate components, and/or one or more condensable gases (as described herein), ahead of being sent to the system for reducing iron. Certain exemplary conditions and compositional information for the various streams in the process are provided in FIGS. 2 and 3. FIGS. 4A-4M depict compositional information and characteristics of various exemplary bio-oil samples that were tested. FIGS. 4A-4B pertain to two samples of bio-oil, where along with compositional information such as carbon and hydrogen content that were identified, a heating value was identified, as well as a determination of metals and water in the bio-oil samples were also observed. Results from these samples includes approximately 31 to 35 wt % of carbon in the bio-oil. With respect to FIGS. 4C-4F, the amount of carbon in such samples were much higher (from about 46 wt % to about 55 wt %), though having a lower oxygen content. FIGS. 4G-4M depicted compositional information of different bio-oil samples including water content and on a dry basis, along with ash content. As noted, samples with high ash and/or moisture content generally correlated with a reduced amount of carbon in such bio-oil samples.

As depicted in FIGS. 1A and 1B, ATR-100 represents a reformer for producing syngas. In some embodiments, the reformer is an autothermal reformer and/or an entrained flow gasifier. As depicted, in some embodiments, the reformer (ATR-100) receives one or more feed streams. In some embodiments, the one or feed streams include bio-oil (stream 001, fuel supply) and/or oxygen (stream 002). In some embodiments, a steam feed stream and/or a carbon dioxide stream may be fed to the reformer (not shown).

As described herein, in some cases, bio-oil is obtained via biomass. In some cases, bio-oil corresponds to a liquid product made from biomass materials, which may include, for example, agricultural crops, algal biomass, municipal wastes, and/or agricultural and forestry by-products. In some embodiments, as described herein, the bio-oil is produced via biomass, using any method as known in the art. In some embodiments, bio-oil is produced from biomass via one or more thermo-chemical processes. For example, in some embodiments, bio-oil is produced via flash pyrolysis, hydrothermal liquefaction, or others as known in the art.

In some embodiments, bio-oil (stream 001) is fed to the reformer in liquid form. In some embodiments, bio-oil includes from about 20 wt % (by weight) to about 70 wt % carbon, from about 3 wt % to about 15 wt % hydrogen, and/or from about 20 wt % to about 75 wt % oxygen, on a dry basis or a wet basis (e.g., with or without considering the presence of water) (see FIG. 2 for example). In some embodiments, the bio-oil includes a water content, for example, due to water found in the biomass material. In some embodiments, the water in bio-oil is obtained via condensation of water droplets in air that the biomass materials and/or bio-oil are exposed to. In some embodiments, water is added to the bio-oil to boost the water content. In some embodiments, the ratio of mass flow rate of bio-oil to mass flow rate of water in the bio-oil feed stream is from about 1:2 to about 3:1.

In some embodiments, the bio-oil is stored for use in syngas production. For example, in some cases, bio-oil is stored in a container, tank, or other enclosure. In some embodiments, the bio-oil storage means (e.g., container, tank, etc.) is in fluid communication with the reformer (e.g., ATR-100). In some embodiments, the bio-oil is configured to be delivered to the reformer on a continuous basis, such that syngas production is a continuous process. In some embodiments, the bio-oil is configured to be delivered according to a batch basis, such that syngas production is a batch process.

In some embodiments, a pyrolysis plant can be located onsite (e.g., near the reformer) and can be used to produce the bio-oil. Additionally or alternatively, at least a portion of the bio-oil can be replaced by a pyrolysis off-gas from the pyrolysis plant. For example, the pyrolysis off-gas can form at least a portion of the bio-oil feed stream.

In some embodiments, the bio-oil is configured to be transferred to the reformer via a pump. In some embodiments, the pressure of the bio-oil stream being fed to the reformer is from about 500 psi to about 2000 psi, such as about 800 psi, 1000 psi, 1200 psi, or 1500 psi. In some embodiments, the pressure of the bio-oil stream being fed to the reformer is from about 1 psig to about 100 psig, from about 2 psig to about 50 psig, from about 3 psig to about 30 psig, or from about 5 psig to about 20 psig, such as about 8 psig, 10 psig, 12 psig, or 15 psig. In some embodiments, one or more pumps in series and/or parallel are configured to deliver the bio-oil to the reformer from the storage means.

In some embodiments, though the bio-oil may be pumped to the reformer in continuous liquid form, at least part of the bio-oil entering the actual reformer (e.g., ATR-100) is transitioned into droplet form. In some embodiments, providing the bio-oil in droplet form helps with the production of syngas. For example, in some cases, the bio-oil droplets can be exposed to oxygen for partial oxidation to maintain high temperatures. In some embodiments, the droplet form provides greater surface area of the bio-oil for reforming.

In some embodiments, heating the bio-oil does not vaporize the bio-oil. Instead, in some embodiments, heating the bio-oil changes certain properties of the bio-oil, such as increasing (or decreasing) the viscosity, and in some cases, heating the bio-oil forms a thick or solid substance (e.g., solid congealed fraction).

Accordingly, to provide the bio-oil in droplet form, in some embodiments, the bio-oil enters the reformer using an atomizing nozzle configured to create a fine bio-oil aerosol. In some embodiments, the bio-oil enters the reformer using a single-fluid swirl atomization nozzle. In some embodiments, prior to entering an atomizing nozzle or other outlet (e.g., pipe outlet), the flow path of the bio-oil (and optionally other feed streams) is configured to cause two high pressure streams to collide, thereby helping "shatter" the bio-oil streams into aerosols. In some embodiments, forming bio-oil droplets by colliding two streams may help reduce the risk of potential blocking of one or more holes in an atomizer (e.g., due to thickened bio-oil in the feed stream at high temperatures, as described herein). In some embodiments, the flow path (for colliding two high pressure streams) may include two different flows of bio-oil (e.g., stream 001) combining, wherein the two different flows may be from an original single flow path that split into two prior to re-joining, and/or the two different flows may be from two separate pumps (and/or two different storage means).

In some embodiments, the bio-oil is heated to high temperatures to help with syngas production, by, for example, providing high temperature droplets of bio-oil to the reformer. In some embodiments, as described herein, heating the bio-oil can change the viscosity and/or surface tension of the liquid bio-oil, which in some cases, increases the atomizing efficiency by forming smaller droplets. In some embodiments, the droplet size of the bio-oil entering the reformer is at most about 10 µm, 25 µm, 50 µm, 75 µm, or 100 µm. In some embodiments, the droplet size of the bio-oil entering the reformer is at most from about 10 µm to about 100 µm. In some embodiments, the droplet size of the bio-oil entering the reformer, as expressed by Sauter diameter $D_{3,2}$ is from about 10-40 µm (microns), such as for example 20-40 µm or 30-40 µm. In some embodiments, increasing the bio-oil feed temperature helps reduce the amount of heat required by the reformer to decompose the bio-oil, thereby decreasing the thermal load to reform each droplet, resulting in lower oxygen consumption, and higher equivalence ratios.

In some embodiments, the bio-oil is stored at room temperature. In some embodiments, the bio-oil feed stream (e.g., stream 001) is warmed prior to entering the reformer. For example, in some embodiments, the bio-oil is heated to at least 30° C., 40° C., 50° C., 60° C., 75° C., 90° C. 100° C., 110° C., or 125° C. In some embodiments, the bio-oil is heated from at least about 25° C. to about 150° C., such as from about 30° C. to about 80° C., from about 30° C. to about 50° C., or from about 50° C. to about 100° C. In some embodiments, the bio-oil is heated using a heat exchanger. In some embodiments, the bio-oil is heated using the gas produced by the reformer (e.g., via a heat exchanger). In some embodiments, the bio-oil is heated using an electric heater or steam.

In some embodiments, the bio-oil feed (e.g., stream 001) to the reformer is mixed with the oxygen feed (e.g., stream 002), thereby sustaining a partial oxidation reaction. In some embodiments, the bio-oil feed is mixed with the oxygen feed prior to entering the reformer (e.g., ATR-100), after entering the reformer, or both. In some embodiments, the amount of oxygen fed to the reformer and/or the amount of bio-oil fed to the reformer is regulated based on an equivalence ratio (ER), corresponding to the moles of oxygen fed to the reformer divided by the moles of oxygen necessary to achieve stoichiometric combustion of the feed. In some cases, lower equivalence ratios in the range of about 0.1 to 0.6, such as for example about 0.25 to 0.4, produce a higher energy syngas. In some cases, such lower equivalence ratios can produce syngas with higher concentrations of tars and particulates.

In some embodiments, the amount of steam fed to the reformer and/or the amount of bio-oil fed to the reformer is regulated based on a steam-to-carbon ratio (S/C), corresponding to the moles of steam fed to the reformer divided by the moles of the carbon in the feed. As described herein, in some embodiments, the amount of steam fed to the reformer can be based on the quality and water content in the bio-oil feed (e.g., stream 001). In some cases, increasing the S/C reduces soot particulate formation and/or build-up.

In some embodiments, the reforming temperature is from about 500° C. to about 2000° C., such as for example from about 900° C. to about 1500° C. In some embodiments, increasing the ER increases the reforming temperature, improves cracking rates, and/or improves reforming rates. In some embodiments, reforming the bio-oil is a self-sustaining partial combustion reaction, wherein heat required to reform the bio-oil is provided by the exothermic reforming reaction. In some embodiments, the reformer is required to be initially heated by a secondary heat input, so as to enable such reforming of the bio-oil, after which, the secondary heat input may no longer be needed given the self-sustaining characteristic of the reforming reaction. In some embodiments the secondary heat input comprises a heater, such as an electric heater, and/or combustion heater, configured to heat the reformer. In some embodiments, the reformer is fed with natural gas (e.g., methane) as fuel for the secondary heat input. In some embodiments, once the reformer attains a minimum temperature, heat from the secondary heat input is ceased.

In some embodiments, the reformer produces a gas stream (stream 101). In some embodiments, gas stream (stream 101), which comprises syngas, includes, as described herein, condensable gases, non-condensable gases, particulate matter, and inorganic matter. In some embodiments, the condensable portion includes any remaining, uncracked long-chain organic compounds (tars) and water vapor. In some embodiments, the non-condensable portion includes carbon monoxide, methane, trace hydrocarbons up to C6 (e.g., up to C4), carbon dioxide, and/or hydrogen. In some embodiments, some of the components of the gas stream (stream 101) are contaminants, which may include molecules containing chlorine, sodium, potassium, nitrogen, phosphorous, tar, gangue, and/or sulfur. In some cases, the gas stream is considered dirty just after leaving the reformer as it contains trace tars, particulates, and inorganic contaminants. As described herein, in some embodiments, the gas stream from the reformer is further processed to reduce or remove at least some of these contaminants. In some cases, however, said contaminants may not reduce the quality of a downstream product (e.g., a material comprising iron in the reduction process). In some embodiments, removal of certain contaminants (e.g., chlorine, sodium, potassium, nitrogen, etc.) may be cheaper if removed in a downstream process, such as during a steelmaking process (e.g., via slag formation in the electric arc furnace).

FIG. 2 depicts exemplary bio-oil feed (e.g., stream 001 in FIGS. 1A-1B) compositions having varying carbon content, where higher carbon content correspond to "heavy ends"

bio-oil, lower carbon content correspond to "light ends", and medium FPBO refers to carbon content in between the heavy and light ends. FIG. 2 further depicts exemplary produced syngas compositions corresponding to the bio-oil feed (e.g., heavy and light ends bio-oil). As shown, syngas produced with heavy-ends bio-oil feed contained a higher amount of carbon monoxide and hydrogen relative to oxygen content, as compared with syngas produced with light-ends bio-oil feed. Thus, in some cases, syngas produced with heavy ends bio-oil feed is a more favorable reducing gas than syngas produced with light ends bio-oil feed.

In some embodiments, the gas stream (stream 101) passes through a filter HGF-200 (e.g., particulate filter, baghouse filter, hot gas filter, hot carbide candle filter, etc.). In some embodiments, the filter removes particulate matter found in the gas stream (that may have resulted due to, for example, partial combustion of the bio-oil in the reformer). In some cases, the particulate matter is mainly composed of char (e.g., solid carbon or biochar), trace amounts of ash, and/or other inorganic matter. In some embodiments, the filter is operated at least at about 250° C. to about 1000° C., such as from about 450° C. to about 900° C., so as to help avoid the formation of tar and soot agglomerates. In some cases, at a temperature of at least about 250° C. to about 900° C., such as at least about 450° C., char is collected on a fine mesh filter, wherein tar that is still in the gas phase pass through the char and filter. In some cases, the char works as a catalyst to crack long chain tars into non-condensable gas.

In some embodiments, the filtered gas stream (stream 201) is then passed through a tar scrubber (SCB-300) configured to remove trace tars present in the gas stream through adsorption, filtration, and/or using a bed of activated carbon. In some cases, activated carbon is also known to reduce hydrogen sulfide ($H_2S$) via adsorption as well. In some embodiments, the tar scrubber operates from about 200° C. to about 500° C., such as about 450° C. In some cases, however, tars, which can be or include unreformed bio-oil components, provide carbon to the material comprising iron (for example in a downstream direct reduction iron process) as they break down catalytically in the furnace in the presence of iron as a catalyst. In some cases, higher carbon can have three positive effects: (1) increases conductivity of the downstream electric arc furnace (EAF) melt which improves lifetime of the EAF's electrodes, (2) increases metallic yield by reducing any remaining iron oxides from the cores of ore granules that are exposed when they melt, and/or (3) supplies carbon to support slag foaming in EAFs.

In some embodiments, the filtered and scrubbed gas stream (stream 301) is then passed through a condenser (SCB-400), to condense out at least some of the condensable gases from the gas stream (stream 301). In some embodiments, the condenser includes a heat exchanger. For example, in some embodiments, the condenser (SCB-400) includes a shell and tube heat exchanger. In some embodiments, the gas stream (stream 301) is passed through the shell, whereas water is passed through the tube. In some cases, the gas stream (stream 301) is cooled to a temperature from about 10° C. to about 30° C., such as about 20° C. In some embodiments, the condensed fluid (e.g., condensed water, at stream 402) is separated from the gas stream. In some embodiments, the condensed fluid (e.g., water) is drawn through a pump and routed for storage, further processing, and/or waste. In some embodiments, the amount of condensed fluid is monitored to determine the amount of condensable gases in the gas stream (stream 301).

In some embodiments the gas stream (e.g., any one or more of stream 101, 201, 301 and 401) is further processed to remove or reduce the amount of sulfur therein. In some embodiments, such removal of sulfur is via a desulfurization process step, which may include an adsorbent and/or a membrane system. In some embodiments, the sulfur removal process is located before other traditional gas cleanup steps that are common to direct reduction processes (e.g., $CO_2$ scrubbing and dewatering).

In some embodiments, the gas stream (stream 401), or syngas, is routed for storage, to flare (e.g., via FLR-500 and producing stream 1102 for example), and/or use in a downstream process, as described herein (e.g., direct reduction iron process, etc.). In some embodiments, the syngas is used in a direct reduction iron process for reducing iron ore, so as to produce material comprising iron. In some embodiments, the material comprising iron comprises one or more of pure iron, direct reduced iron, hot briquetted iron, pig iron, molten iron, hot metal, sponge iron, or an iron rich metal. In some embodiments, the material comprising iron is used to make one or more products, such as steel, as known in the art. In some embodiments, the material comprising iron comprises iron metallics high in gangue, which may then be smelted (such as in an electric smelting furnace) to separate iron from slag, and thereby producing molten iron which can be directly used in a steelmaking process or solidified to a synthetic pig iron.

With respect to FIG. 1B, in some embodiments, any one or more, including all, of the processes after the reformer (e.g., SC-250, HGF-200, SCB-300, SCB-400, SCB-450, and/or FLR-500) may not be present. For example, the syngas may travel from the reformer to the furnace with little or no intermediate processing (e.g., as shown in FIG. 1A).

In some cases, producing said material comprising iron includes the following transition: $Fe_2O_3$ (hematite)→$Fe_3O_4$ (magnetite), $Fe_3O_4$→FeO (wustite) $Fe_2O_3$→Fe (metallic iron). In some cases, steel is produced via iron (e.g., Fe→steel alloys). In some cases, ironmaking produces metallic iron (Fe) from iron ore. As described herein, traditionally a feedstock like coal or natural gas is used to produce syngas (e.g., containing CO and/or $H_2$), which provides a reducing agent that will remove the oxygen off the $Fe_2O_3$ to produce Fe+$CO_2$+$H_2O$ via the aforementioned reduction sequence. In some embodiments, as described herein, syngas produced from bio-oil (according to an embodiment here) may be used instead of or in addition to syngas produced from coal, natural gas, or other syngas fuel sources. In some embodiments, two technologies used to produce iron include Blast Furnaces (coal) and Direct Reduction Furnaces (natural gas).

In some embodiments, in a blast furnace, the coal (e.g., pure C) is burned at high temperatures and undergoes the Boudouard reaction with pure oxygen to form CO. In some embodiments, the CO reduces the iron ore above the melting point of the metallic iron/ore, and produces a liquid flow of hot metal. In some cases, the liquid flow of hot metal flows into a Basic Oxygen Furnace for steelmaking (adding carbon, alloying, mixing with scrap, etc.). In some embodiments, blast furnaces and basic oxygen furnaces are tolerant of high slag proportions, and so are amenable to both magnetite and hematite lump ores and pellets (beneficiated if necessary to 60-67% Fe content, plus oxygen and some gangue).

In some embodiments, in a direct reduction process, natural gas is steam reformed to CO and $H_2$. As described herein, in some embodiments syngas produced from bio-oil (according to an embodiment herein) can be used in a direct reduction process. In some embodiments, using a direct reduction furnace (for example), the CO and $H_2$ reduce the iron ore below the melting point of the metallic iron/ore, and produce a solid flow of sponge iron pellets. In some embodiments, these pellets are either used onsite or are compressed into hot briquetted iron bricks for transport offsite. In some embodiments, the pellets or briquettes are feedstock for steelmaking in an Electric Arc Furnace (adding carbon, alloying, mixing with scrap, etc.). In some embodiments, the electric arc furnace is more sensitive to slag proportions, and so typically direct reduction furnaces only use high metal content pellets (>67% Fe, ~30% oxygen and a few points of gangue) which must be beneficiated up from whatever original ore content at or near the mine. In some cases, beneficiation of pellets before direct reduction is not performed, and then direct reduction is paired with other smelting routes (instead of an electric arc furnace) to better handle the higher slag content.

In some embodiments, using a direct reduction iron process, inside the furnace, reducing gas of CO and $H_2$ removes oxygen out of the iron oxide to evolve it from hematite ($Fe_2O_3$), to magnetite ($Fe_3O_4$), to wustite (FeO), to metallic iron (Fe) and sometimes even to cementite (FeC). In some cases, these reactions proceed at around about 700-1200° C. (e.g., about 900-1000° C.).

In some embodiments, the CO reactions are mostly exothermic, releasing energy/heat that continues to drive the reactions forward. In some cases, by contrast, all the $H_2$ reactions are endothermic. Accordingly, in some cases, this puts an immediate focus on maintaining the right ratio of $H_2$:CO to maintain a stable operating temperature. In some existing direct reduction iron processes, the standard is about a 1 to 2 (e.g., 1.5) $H_2$:CO ratio, though it can vary from about 0.2 to about 4 with other process changes.

In some cases, where there is an additional heat source, the furnace can operate at full $H_2$ with no CO. In some cases, such a process may lead to zero or substantially zero $CO_2$ ironmaking with pure $H_2$ from renewable-powered electrolysis when there is an external heating source.

In some embodiments, the crystal structure of the iron oxides changes as it evolves. In some cases, during the transition from hematite to magnetite, this results in significant expansion of the volume of the ore, which tends to crack and expose the ore to additional intrusion of reducing gas. In some cases, during the transition from wustite to iron, the reaction with CO is 100× slower than the reaction with $H_2$ (despite the exo-thermicity vs. endo-thermicity), because the $H_2$ helps nucleate the crystal structure changes while the CO does not.

In some embodiments, a direct reduction furnace has no ambient air intrusion, so the flue gas coming out of the furnace is a well-contained pipe of CO, $CO_2$, H2 and $H_2O$. In some cases, the $CO_2$ can be separated by condensing off the water and using a carbon capture system, in some cases an Amine based unit, and/or in some cases Pressure Swing Adsorption. In some cases, this makes direct reduction furnaces a perfect target for flue stack carbon capture and sequestration.

As described herein, in some embodiments, the syngas can be fed to a furnace (e.g., direct reducing furnace, shaft furnace) for reducing iron ore to iron (for example via a MIDREX® system). In some cases, the syngas is further processed (e.g., gas cleanup as described herein) prior to being fed to a shaft furnace.

In another embodiment, the syngas produced via bio-oil is formed within a furnace itself (such as for example, similar to a HYL ENERGIRON® system), wherein the reformer and furnace may be combined. Accordingly, the syngas may be formed and used to reduce the iron ore in the same shaft furnace, which may increase carbon content, and eliminate the need for a separate reformer.

In some embodiments, in reducing iron ore to iron using syngas produced by bio-oil (e.g., according to an embodiment described herein), one or more of particulate matter, tars, chlorine and sulfur are not removed. In some embodiments, for example, direct reduction grade Iron ore pellets comprise between about 50% to about 80% (e.g., 67%+) iron, wherein in some cases, such iron ore pellets comprise about 20% to about 50% (e.g., 30%) oxygen content, and about 1% to about 10% (e.g., 3%) gangue content (e.g. $SiO_2$, CaO, $Al_2O_3$, MgO, etc.).

In some embodiments, about 0.4 to about 1.00 (e.g., 0.75) ton Bio-oil is required to reduce 1 ton material comprising iron (e.g., hot briquetted iron). In some embodiments, the entire ironmaking system including boilers is fueled with bio-oil, changing bio-oil demand (e.g., increasing the amount of Bio-oil used, for fuels and boilers).

In some embodiments, reforming the bio-oil with the iron ore reduction beneficially increases cementite and graphite content aka carbon in the resulting sponge iron (reduced iron ore), such that letting tars be reformed in the furnace itself may actually increase the quality and value of the sponge iron produced by increasing its carbon content. For example, an estimated tar loading of 4% with the bio-oil, which if translated at 100% to carbon content of the pellet, may result in an improvement in the quality of the produced iron as compared to traditional direct reduction iron processes.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

EXEMPLARY EMBODIMENTS

Disclosed herein, in some aspects, is a process for producing syngas, comprising: providing bio-oil to a reformer, wherein the bio-oil is at least partially atomized when entering the reformer; and reforming the bio-oil within the reformer, thereby producing syngas.

In some embodiments, the bio-oil is at least partially atomized using an atomizing nozzle. In some embodiments, the bio-oil is at least partially atomized based on providing the bio-oil in at least two streams that collide with each other prior to entering the reformer. In some embodiments, the process further comprises using the syngas to produce a material comprising iron. In some embodiments, the process further comprises using the syngas to reduce iron ore to a metallic iron containing product.

In some embodiments, the process further comprises providing oxygen to the reformer, wherein the oxygen at least partially oxidizes the bio-oil. In some embodiments, the process further comprises regulating the amount of oxygen provided to the reformer based on an equivalence ratio (ER) corresponding to moles of oxygen fed to the reformer divided by moles of oxygen necessary to achieve stoichiometric combustion of the bio-oil. In some embodiments, the ER is from about 0.1 to about 0.6.

In some embodiments, the process further comprises heating the bio-oil prior to providing the bio-oil to the reformer. In some embodiments, the produced syngas is used to heat the bio-oil. In some embodiments, the bio-oil is liquid or substantially liquid. In some embodiments, the bio-oil is provided to the reformer via a pump. In some embodiments, the bio-oil is provided to the reformer at a pressure from about 5 psig to about 20 psig.

In some embodiments, the reforming comprises steam reforming. In some embodiments, the steam is produced in the reformer via water contained in the bio-oil and/or provided with the bio-oil.

In some embodiments, the process further comprises removing one or more contaminants from the syngas. In some embodiments, the one or more contaminants comprise molecules containing sulfur, chlorine, potassium, nitrogen, sodium, phosphorous, tar, particulate and/or gangue, or any combination thereof. In some embodiments, the process further comprises removing one or more condensable gases, non-condensable gases, particulate components, inorganic components, or any combination thereof from the syngas.

In some embodiments, the bio-oil comprises from about 20 wt % to about 70 wt % carbon, from about 3 wt % to about 16 wt % hydrogen, and from about 20 wt % oxygen to about 75 wt % oxygen. In some embodiments, the bio-oil is heated to from about 30° C. to about 80° C. prior to being provided to the reformer. In some embodiments, the atomized bio-oil comprises a droplet size from about 10 μm to about 40 μm.

Disclosed herein, in some aspects, is a system for producing syngas, comprising: a bio-oil source containing bio-oil; a reformer for reforming the bio-oil to produce the syngas; and a flow path fluidly coupling the bio-oil source to the reformer, such that the bio-oil is configured to flow from the bio-oil source to the reformer, wherein the flow path is configured to at least partially atomize the bio-oil.

In some embodiments, the system further comprises an oxygen source for providing oxygen to the reformer. In some embodiments, the flow path comprises an atomizing nozzle for at least partially atomizing the bio-oil. In some embodiments, the system further comprises one or more sub-systems configured to remove a contaminant, a condensable gas, a non-condensable gas, a particulate component, an inorganic component, or a combination thereof from the produced syngas. In some embodiments, the one or more sub-systems comprises a filter, a scrubber, a condenser, an absorber, a membrane, or a combination thereof. In some embodiments, the one or more sub-systems is configured to remove a contaminant from the produced syngas, the contaminant comprising molecules containing sulfur, chlorine, potassium, nitrogen, sodium, phosphorous, tar, particulate, gangue, or a combination thereof.

In some embodiments, the system further comprises a pump for pumping the bio-oil to the reformer, wherein the bio-oil is liquid or substantially liquid. In some embodiments, the pump discharges the bio-oil at a pressure from about 5 psig to about 20 psig. In some embodiments, the system further comprises a heat exchanger for heating the bio-oil prior to entering the reformer. In some embodiments, the heat exchanger uses the syngas produced from the reformer to heat the bio-oil.

In some embodiments, the syngas is used to reduce iron ore to iron. In some embodiments, the system further comprises a furnace configured to receive the produced syngas and iron ore, such that the furnace is configured to reduce the iron ore to iron using the syngas.

Disclosed herein, in some aspects, is a system for producing syngas, comprising: a bio-oil source containing bio-oil; a reformer for reforming the bio-oil to produce the syngas; and a flow path fluidly coupling the bio-oil source to the reformer, such that the bio-oil is configured to flow from the bio-oil source to the reformer, wherein the flow path is configured to at least partially atomize the bio-oil. In some embodiments, using the syngas to produce the material comprising iron comprises reducing iron ore to iron.

All publications, patents, patent applications and other documents cited in this application are hereby incorporated by reference herein in their entireties for all purposes to the same extent as if each individual publication, patent, patent application or other document were individually indicated to be incorporated by reference for all purposes. While various specific embodiments have been illustrated and described, the above specification is not restrictive. It will be appreciated that various changes can be made without departing from the spirit and scope of the present disclosure(s). Many variations will become apparent to those skilled in the art upon review of this specification.

The invention claimed is:

1. A system for producing syngas, comprising:
   a. a bio-oil source containing bio-oil;
   b. an autothermal reformer configured to perform a self-sustaining partial oxidation reaction with the bio-oil to produce syngas; and
   c. a flow path fluidly coupling the bio-oil source to the reformer, such that the bio-oil is configured to flow from the bio-oil source to the reformer, wherein the flow path is configured to at least partially atomize the bio-oil.

2. The system of claim 1, further comprising an oxygen source for providing oxygen to the reformer.

3. The system of claim 2, wherein the oxygen source is configured to regulate an amount of oxygen provided to the reformer based on an equivalence ratio (ER) corresponding to moles of oxygen fed to the reformer divided by moles of oxygen necessary to achieve stoichiometric combustion of the bio-oil.

4. The system of claim 3, wherein the ER is from about 0.1 to about 0.6.

5. The system of claim 4, wherein the ER is at least 0.25.

6. The system of claim 1, wherein the flow path comprises an atomizing nozzle for at least partially atomizing the bio-oil.

7. The system of claim 6, wherein the atomizing nozzle is configured to atomize the bio-oil by colliding a stream of bio-oil with another stream.

8. The system of claim 1, further comprising one or more sub-systems configured to remove a contaminant, a condensable gas, a non-condensable gas, a particulate component, an inorganic component, or a combination thereof from the produced syngas.

9. The system of claim 8, wherein the one or more sub-systems comprises a filter, a scrubber, a condenser, an absorber, a membrane, or a combination thereof.

10. The system of claim 8, wherein the one or more sub-systems is configured to remove a contaminant from the produced syngas, the contaminant comprising molecules comprising sulfur, chlorine, potassium, nitrogen, sodium, phosphorous, tar, particulate, gangue, or a combination thereof.

11. The system of claim 8, wherein the one or more sub-systems comprises a filter for removing particulate matter from a gas stream comprising the syngas.

12. The system of claim 8, wherein the one or more sub-systems comprises a scrubber for removing tar from a gas stream comprising the syngas.

13. The system of claim 8, wherein the one or more sub-systems comprises a condenser for removing water from a gas stream comprising the syngas.

14. The system of claim 1, further comprising a pump for pumping the bio-oil to the reformer, wherein the bio-oil is liquid or substantially liquid.

15. The system of claim 14, wherein the pump discharges the bio-oil at a pressure from about 5 psig to about 20 psig.

16. The system of claim 1, further comprising a heater for heating the bio-oil prior to entering the reformer.

17. The system of claim 16, wherein the heater comprises at least one of an electric heater or a heat exchanger.

18. The system of claim 16, wherein the heater comprises a heat exchanger configured to transfer heat from the syngas to the bio-oil.

19. The system of claim 1, further comprising a furnace configured to receive the produced syngas and iron ore, such that the furnace is configured to reduce the iron ore to iron using the syngas.

20. The system of claim 19, wherein the furnace is configured to reduce the iron ore to a metallic iron containing product using the syngas.

21. The system of claim 1, wherein the syngas is produced by steam reforming the bio-oil.

22. The system of claim 21, wherein the steam reforming is achieved using at least one of water contained in the bio-oil, water provided with the bio-oil, or steam fed to the reformer.

23. The system of claim 1, wherein the bio-oil comprises from about 20 wt % to about 70 wt % carbon, from about 3 wt % to about 16 wt % hydrogen, and from about 20 wt % oxygen to about 75 wt % oxygen, on a dry basis or a wet basis.

24. The system of claim 1, wherein the atomized bio-oil comprises a droplet size from about 10 μm to about 40 μm.

25. The system of claim 1, wherein the reformer is configured to receive pyrolysis off-gas in addition to the bio-oil.

26. The system of claim 1, further comprising a heat source configured to heat the reformer to initiate the self-sustaining partial oxidation reaction.

27. The system of claim 26, wherein the heat source comprises at least one of a heater, an electric heater, a combustion heater, or natural gas combustion.

28. The system of claim 1, wherein the partial oxidation reaction produces syngas comprising hydrogen and carbon monoxide.

29. A process for producing syngas, comprising:
 a. providing bio-oil to an autothermal reformer, wherein the bio-oil is at least partially atomized when entering the reformer; and
 b. reforming the bio-oil within the reformer, thereby producing syngas,
 wherein the reformer is configured to perform a self-sustaining partial oxidation reaction with the bio-oil to produce the syngas, and
 wherein in providing the bio-oil to the reformer comprises using a flow path fluidly coupling a bio-oil source to the reformer, such that the bio-oil is configured to flow from the bio-oil source to the reformer.

\* \* \* \* \*